Oct. 14, 1924.

P. J. FLAHERTY 1,511,877

WATER GAUGE PROTECTOR

Filed March 15, 1921    3 Sheets-Sheet 3

INVENTOR.
Patrick J. Flaherty
by Bakewell, Byrnes, Parmelee
his Atty.

Patented Oct. 14, 1924.

1,511,877

UNITED STATES PATENT OFFICE.

PATRICK J. FLAHERTY, OF NEW CASTLE, PENNSYLVANIA, ASSIGNOR TO JOHNSON BRONZE COMPANY, OF NEW CASTLE, PENNSYLVANIA, A CORPORATION OF PENNSYLVANIA.

WATER-GAUGE PROTECTOR.

Application filed March 15, 1921. Serial No. 452,478.

*To all whom it may concern:*

Be it known that I, PATRICK J. FLAHERTY, a citizen of the United States, residing at New Castle, in the county of Lawrence and State of Pennsylvania, have invented a new and useful Improvement in Water-Gauge Protectors, of which the following is a full, clear, and exact description.

The present invention relates broadly to gauges, and more particularly to protecting or safety devices for water gauge glasses such as are used on steam boilers and the like.

An important object of the present invention is to provide a protective casing for gauges having means facilitating the determination of the water level in the gauge glass.

Another object of the invention is to provide the casing with a plurality of removable transparent plates enabling the gauge glass to be viewed from different positions.

A further object of the invention is to provide a protective casing of this nature having a substantially uniform cross-sectional area throughout the entire length thereof, and provided with a drain or waste opening at its bottom portion.

Still a further object of the invention is to provide a casing constructed of a number of parts adapted to be expeditiously assembled and forming longitudinal guides for the transparent plates.

The foregoing and other objects of the present invention, together with their attendant advantages, will be apparent as the invention becomes better understood by reference to the accompanying specification and drawings forming a part thereof, it being premised that changes may be made in the various details and manner of operation within the scope of the appended claims without departing from the spirit of the invention.

Figure 1:
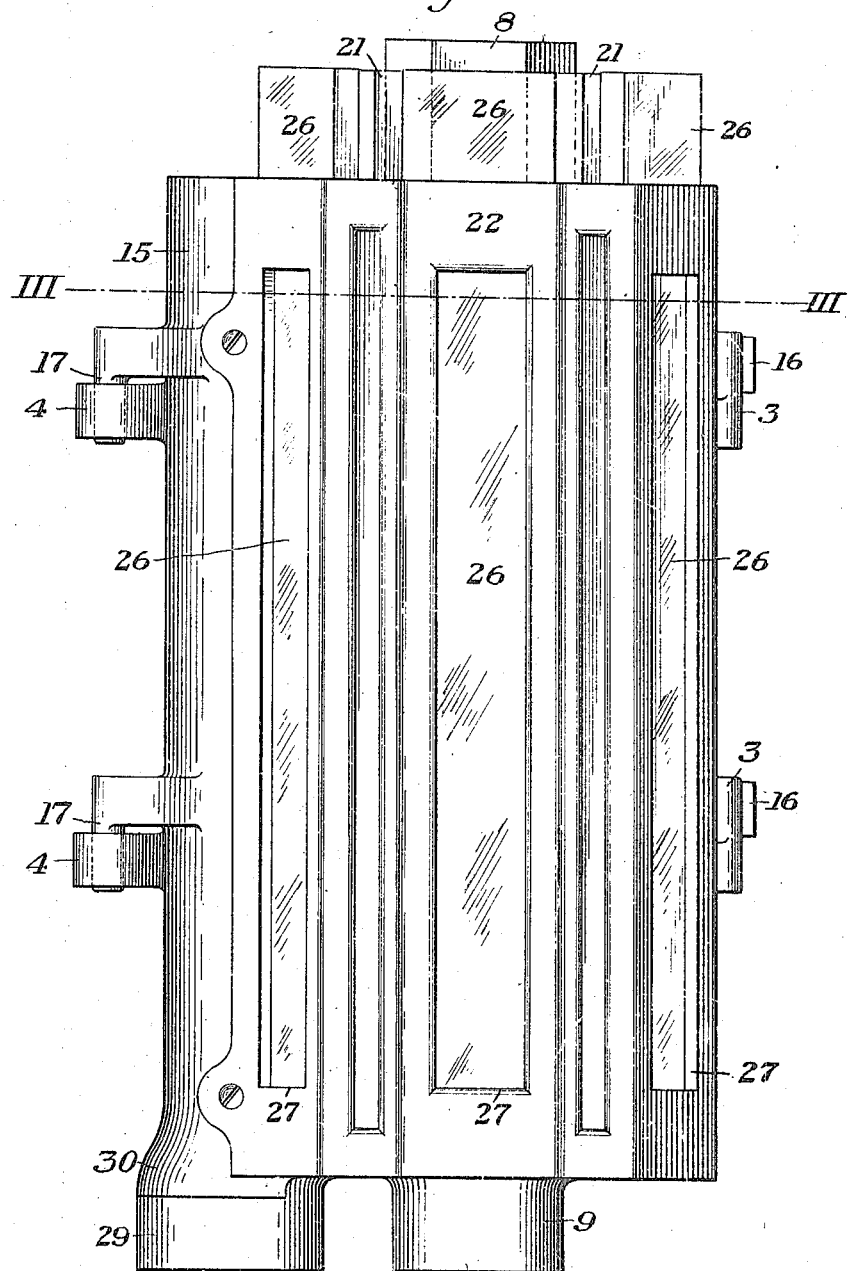
Figure 1 is a front view of the protector with the parts of the casing in assembled position.
Figure 2:
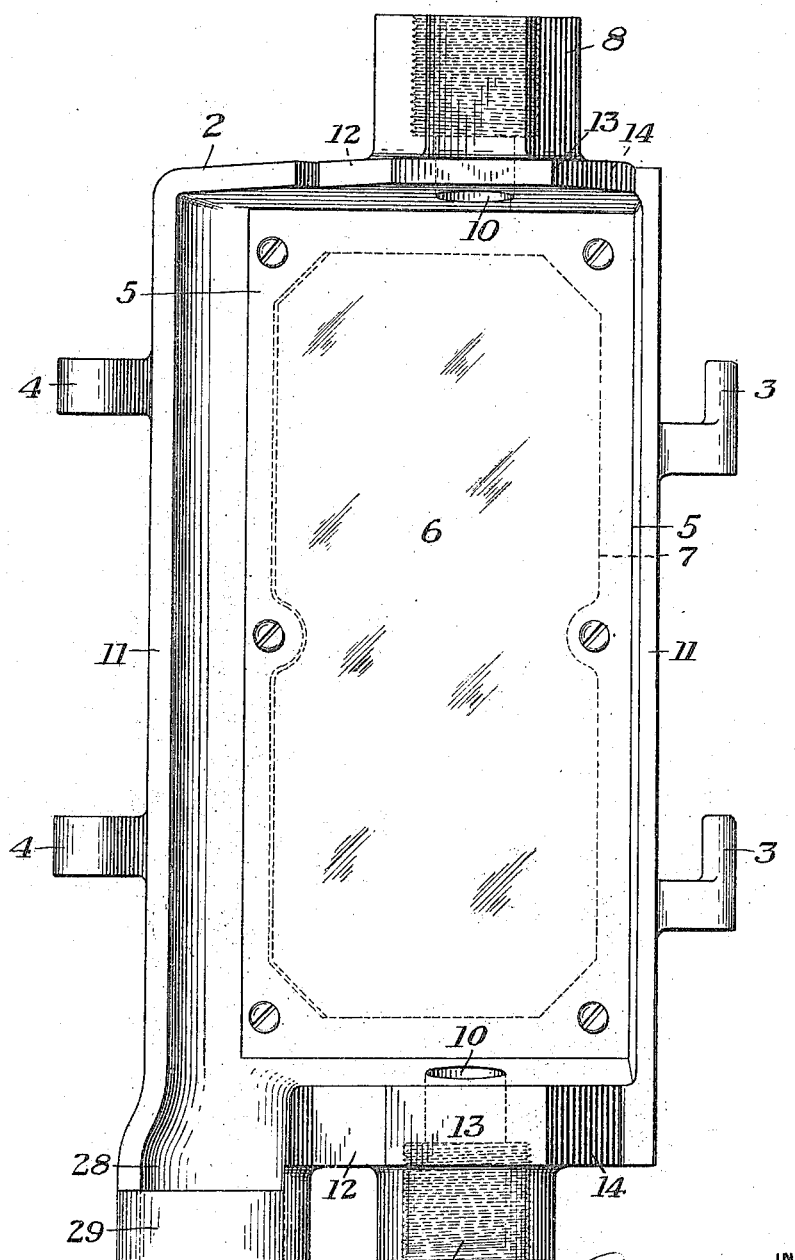
Figure 2 is a front view of the back member of the casing showing the interior construction thereof.

At the present time it frequently happens that gauge glasses used in connection with boilers, become broken from accident or defective construction, endangering the safety of any person in the vicinity thereof. It is therefore desirable to provide a protective device adapted to cooperate with such gauge glasses to prevent the water, steam and flying particles of glass from doing injury. While several different types of casings have been proposed, they have been more or less objectionable due particularly to the difficulty in obtaining an accurate reading of the water level in the gauge glass. If burning of the boiler tubes, or boiler, is to be prevented, an accurate reading is essential and the present invention is designed to facilitate such a reading.

Referring more particularly to the drawings, there is illustrated a protective device of the character referred to, comprising a back member 2 of general rectangular shape, having projecting from one side thereof a plurality of supporting pins 3, and from the other side thereof a plurality of engaging hooks 4.

Suitably secured to the back of the casing is a plate 5 having a light reflecting inner surface 6. This reflecting surface may be constructed by enameling the back, silvering, or in any other desired manner. In order to conserve metal in the back member, it may be formed with an opening 7 adapted to be closed by the reflecting member. The provision of a light reflecting member in the rear portion of the casing has been found highly desirable as it cooperates with the gauge glass in a peculiar manner, as will be apparent, to enable an accurate reading thereof.

Secured to the top of the back member 2, is a threaded extension 8, and secured to the bottom of the back member in alignment with the extension 8, is a similar extension 9. These extensions form coupling members enabling the casing to be operatively assembled with relation to the connections leading to the gauge glass, the gauge glass itself when in operative position extending longitudinally of the back member, with its ends supported in the bearings 10 formed in the top and bottom thereof, respectively.

The back member has its side edges machined to form longitudinally extending seats 11 and has its end walls shaped to provide a plurality of angularly extending seats 12, 13 and 14, on each end thereof. Co-operating with the back member 2 of the casing, is a front member 15 having on one of its longitudinal sides a plurality of hooks 16 adapted to engage the pins 3, and on its opposite side a plurality of pins 17 adapted to be engaged by the hooks 4 on the back member when the parts are moved relatively to each other in a longitudinal direction. The front member is shaped to provide a plurality of angularly related faces 18, 19 and 20 adapted to cooperate with the seats 12, 13 and 14 to form pockets for the reception of transparent plates 21, longitudinally slidable in the pockets, and having their upper ends projecting above the casing as shown in Figure 1.

Figure 3:
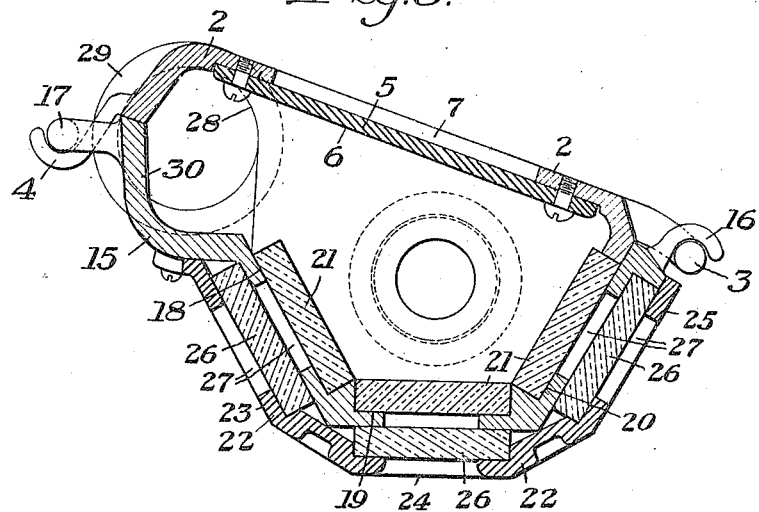
Figure 3 is a transverse sectional view on the line III—III of Figure 1.
Figure 4:
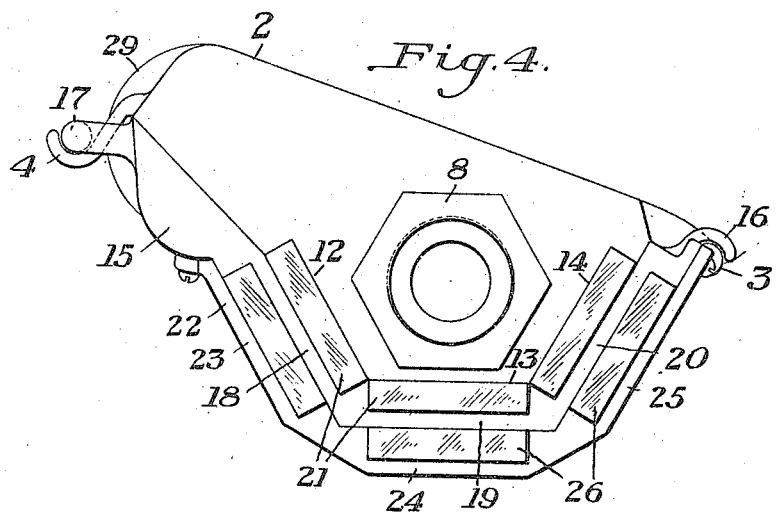
Figure 4 is an end view of the construction illustrated in Figure 1.

Adapted to be secured to the front part of the casing is a guard 22 having angularly related faces 23, 24 and 25 cooperating with the faces 18, 19 and 20, respectively, in such manner as to form a second series of pockets for the reception of outer transparent plates 26, similar to the plates 21. In order to permit the passage of light through the plates to the interior of the casing, each of the angular faces on both the front member and the guard are longitudinally slotted to provide openings 27, as clearly shown in Figures 1 and 3.

In case of breakage of the gauge glass from any cause it is desirable to provide the casing with means for draining off the broken glass, steam and water. For this purpose, the back plate is formed at one side of the threaded extension 9 with a semi-circular pocket 28 having an enclosing band 29 at the lower portion thereof. This pocket is adapted to cooperate with a similar pocket 30 formed in the front member so that when the parts are in assembled position, an escape opening will be provided through the bottom of the casing permitting free drainage of the same.

With the construction of casing disclosed, three reading faces are provided, enabling people in three different angular positions with relation to the gauge glass to read the same. The provision of the reflecting surface 6 in the back member causes the light entering through each set of transparent plates to be reflected against the gauge glass thereby facilitating an accurate reading thereof.

The advantages of the present invention arise from the provision of a gauge glass having a reflecting member, in the rear portion thereof.

Further advantages of the invention arise from the provision of a sectional casing having a plurality of sets of transparent plates cooperating with the reflecting member as described.

I claim:

1. As an article of manufacture, a protective device for gauge glasses, comprising a casing having a front member provided with a transparent panel, a back member cooperating with said front member and having an opening therein, and a removable member carried by said back member and closing said opening, said removable member having a uniform uninterrupted light reflecting surface, substantially as described.

2. As an article of manufacture, a protective device for gauge glasses, comprising a casing having a front member, a series of transparent plates carried thereby, a back member cooperating with said front member and having an opening therein, and a removable light reflecting member carried by said back member and closing said opening, substantially as described.

3. As an article of manufacture, a protective device for gauge glasses, comprising a casing having a back member, a front member separable therefrom, a guard detachably secured to said front member, said front member having a plurality of angularly related open faces and said guard having corresponding angularly related open faces opposite to and spaced from the first mentioned angularly related faces, and a plurality of transparent plates clamped between each pair of opposite faces of the front member and guard, substantially as described.

4. As an article of manufacture, a protective device for gauge glasses, comprising a casing of substantially uniform cross-sectional area throughout its entire length adapted to enclose the glass, said casing having a back member provided with a drain opening, a semi-circular pocket leading thereto, a front member cooperating with said back member, and a second pocket formed in said front member for cooperation with the pocket in the back member, substantially as described.

5. As an article of manufacture, a protective device for gauge glasses, comprising a casing having a back member and a front member separable from said back member, a plurality of hooks formed on one side of said back member, and a plurality of pins formed on the opposite side thereof, said front member having a plurality of hooks formed on one side thereof to cooperate with the pins on the corresponding side of the back member, and a plurality of pins formed on the other side thereof to cooperate with the hooks on the corresponding side of the back member, substantially as described.

In testimony whereof, I have hereunto set my hand.

PATRICK J. FLAHERTY.

Witness:
F. E. HANNON.